Patented July 28, 1953

2,647,140

UNITED STATES PATENT OFFICE 2,647,140

PROCESS FOR THE PRODUCTION OF DIALKYLTHIOPHOSPHATES

Heinz Jonas, Leverkusen, Germany, assignor to Farbenfabriken Bayer, Leverkusen, Germany No Drawing. Application December 27, 1950, Serial No. 203,004. In Germany April 16, 1949

4 Claims. (Cl. 260—461)

This invention relates to a process for the production of dialkylthiophosphates.

Until now the production of salts of dialkylthiophosphoric acids is effected by way of the neutral trialkylthiophosphoric acid esters exclusively, the latter being obtained by reaction of phosphorus sulfochloride with alcohol in the presence of pyridine or with alcoholates. The direct addition of sulfur to the ester salts of phosphoric acid so far was not possible because these salts, for instance the sodium salt, readily decompose while disproportionating, or are rearranged respectively.

In accordance with the present invention it has been found that dialkylthiophosphates are easily obtained in a smooth reaction by reacting a dialkylphosphite with sulfur and ammonia or an organic amine. The process is preferably carried out by introducing into a solution of dialkylphosphite in a suitable solvent the calculated quantity of finely powdered sulfur and by introducing into the suspension ammonia or an amine while stirring and cooling. Processing is effected in general above room temperature, so that cooling with water suffices. The sulfur dissolves in accordance with the quantity of ammonia or amine added. Thereby part of the ester salt separates. Finally the solution is saturated with ammonia or amine and the solvent is sucked off from the salt formed. The salt is obtained in a pure state immediately. Suitable solvents are first of all the corresponding alcohols wherein the ammonium salts are fairly soluble in the heat. In the cold these salts may be crystallized out almost quantitatively. As amines methylamine, dimethylamine, etc. may be used.

The invention is further illustrated by the following example without being restricted thereto, the parts being by weight:

Example 35 parts of finely powdered roll sulfur are added to a solution of 140 parts of diethyl phosphite in 500 parts of absolute alcohol. Ammonia is quickly introduced into the solution while stirring and cooling. On heating the solution the sulfur dissolves. For performing the reaction the solution is heated to about 50° C. After saturation with ammonia a viscous solution of the ester salt is obtained which is filtered while warm and is then strongly cooled. Thereby the ammonium diethylthiophosphate separates in thin needles so that all of the solution solidifies. The mass is sucked off and the mother liquor is concentrated. A further small portion of the salt is obtained thereby. In this manner almost 180 parts of a product being analytically pure are obtained. The yield amounts to about 95% of the theoretical.

I claim:

1. In a process of preparing a dialkylthiophosphate the step which comprises mixing under substantially anhydrous conditions a dialkylphosphite with sulfur and a nitrogen compound of the group consisting of ammonia and organic amines, and recovering an amine salt of a dialkylthiophosphate.

2. In a process of preparing a dialkylthiophosphate the step which comprises mixing under substantially anhydrous conditions a dialkylphosphite with sulfur and a nitrogen compound of the group consisting of ammonia and organic amines in the presence of an organic solvent, and recovering an amine salt of a dialkylthiophosphate.

3. In a process of preparing a dialkylthiophosphate the step which comprises mixing under substantially anhydrous conditions a dialkylphosphite with sulfur and a nitrogen compound of the group consisting of ammonia and organic amines in the presence of an alcohol, and recovering an amine salt of a dialkylthiophosphate.

4. In a process of preparing ammonium diethylthiophosphate the step which comprises reacting under substantially anhydrous conditions an ethyl alcoholic solution of diethylphosphite with sulfur and ammonia at a temperature up to about 50° C. and separating the ammonium diethylthiophosphate from the ethanol.

HEINZ JONAS.

References Cited in the file of this patent

Foss, Acta Chem. Scand., vol. 1, pp. 8 and 11–13 (1947).